April 1, 1952
R. E. MEANY
2,591,459
BIRD FEEDER
Filed Sept. 22, 1949
2 SHEETS—SHEET 1
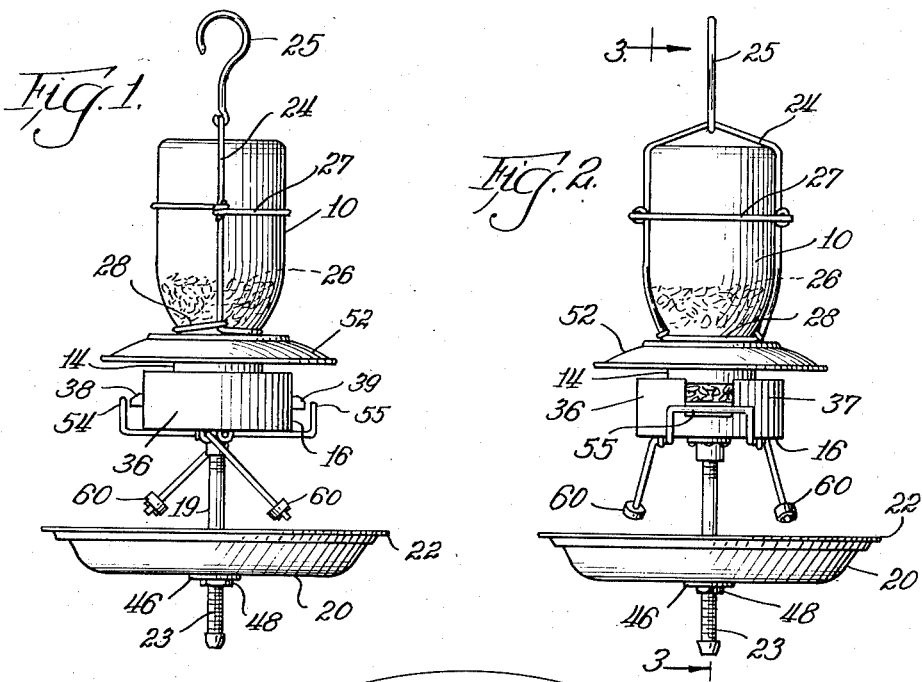
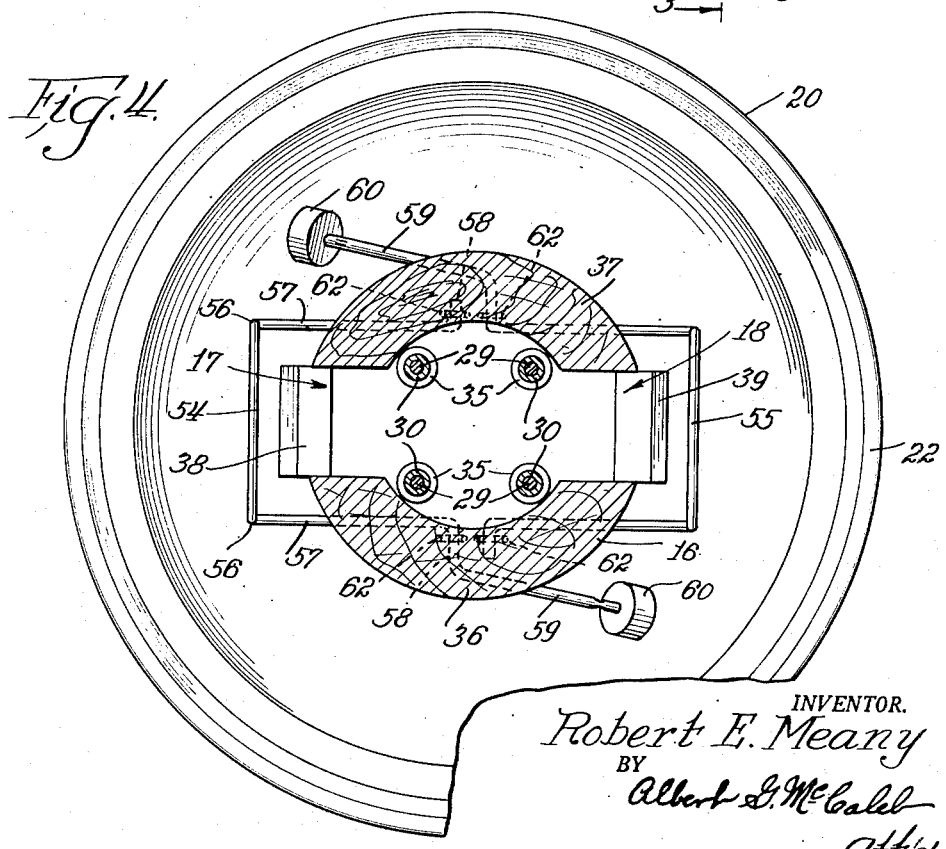
INVENTOR.
Robert E. Meany
BY
Albert G. McCaleb
Atty.

April 1, 1952

R. E. MEANY 2,591,459

BIRD FEEDER

Filed Sept. 22, 1949

INVENTOR.
Robert E. Meany
BY
Albert G. McCaleb
Att'y.

Patented Apr. 1, 1952

2,591,459

UNITED STATES PATENT OFFICE 2,591,459

BIRD FEEDER

Robert E. Meany, Chicago, Ill.

Application September 22, 1949, Serial No. 117,171

7 Claims. (Cl. 119—51)

1

This invention relates to bird feeders, and more particularly to such feeders which are adapted to fabrication in compact and readily supported form and which not only protect the food which is dispensed, but also maintain a sanitary environment and afford selection of the kinds or sizes of birds which can gain access to the food.

One of the objects of my invention is to provide a feeder having a structure such that only birds within a very limited range of size can readily obtain food therefrom.

As a further and correlated object, my preferred feeder structure has a feeding opening which is so restricted and so disposed with respect to a perch that birds within the aforementioned range of size are obliged to assume a somewhat abnormal stance to reach the food initially, and whereupon the food is withdrawn from the feeding opening for eating, so that waste particles, husks, hulls and the like are dropped outside and away from the feeding opening.

My invention also has within its purview the provision of a pan for catching waste particles from the food which are dropped by the bird as it eats, the rim of which pan serves as a perch upon which the bird sits in a position facing over the pan, as it eats.

As another object, the invention comprehends the provision of a bird feeder having parts constructed and arranged so as to require a feeding bird to assume a position such that the excretia of the birds will clear and fall away from the feeder, thus maintaining sanitary conditions at the feeder.

Another object of the invention is to provide a bird feeder having a hopper from which food is fed by gravity to a feeding opening of restricted size and wherein a protective hood for the feeding opening not only serves to shield the food from rain or snow, but also, in its relationship to other parts of the feeder, limits access to the feeder to birds whose statures are smaller than a selected size.

This invention further has within its purview the provision of a bird feeder which gives a very wide range of positions from which feeding birds can be watched while they are feeding.

In one of its aspects, my invention also has within its purview the provision of a movable and counterweighted guard rail adjacent the feeding opening at a position such that it does not interfere with the feeding of birds of a selected size, but which will be moved by small birds trying to gain access to the feeding open-

2 ing, thereby to frighten such small birds away.

In addition to the various objects of my invention which have been set forth, the structure of my bird feeder is such that it may be readily supported for use, easily supplied with feed and adjusted for the feeding of birds within a selected size range.

Other ojects and advantages of the invention will be apparent from the following description and the accompanying drawings in which similar characters of reference indicate similar parts throughout the several views.

Referring to the two sheets of drawings,

Fig. 1 is a side elevational view of a bird feeder embodying my invention in a preferred form;

Fig. 2 is a front elevational view of the bird feeder;

Figure 3:
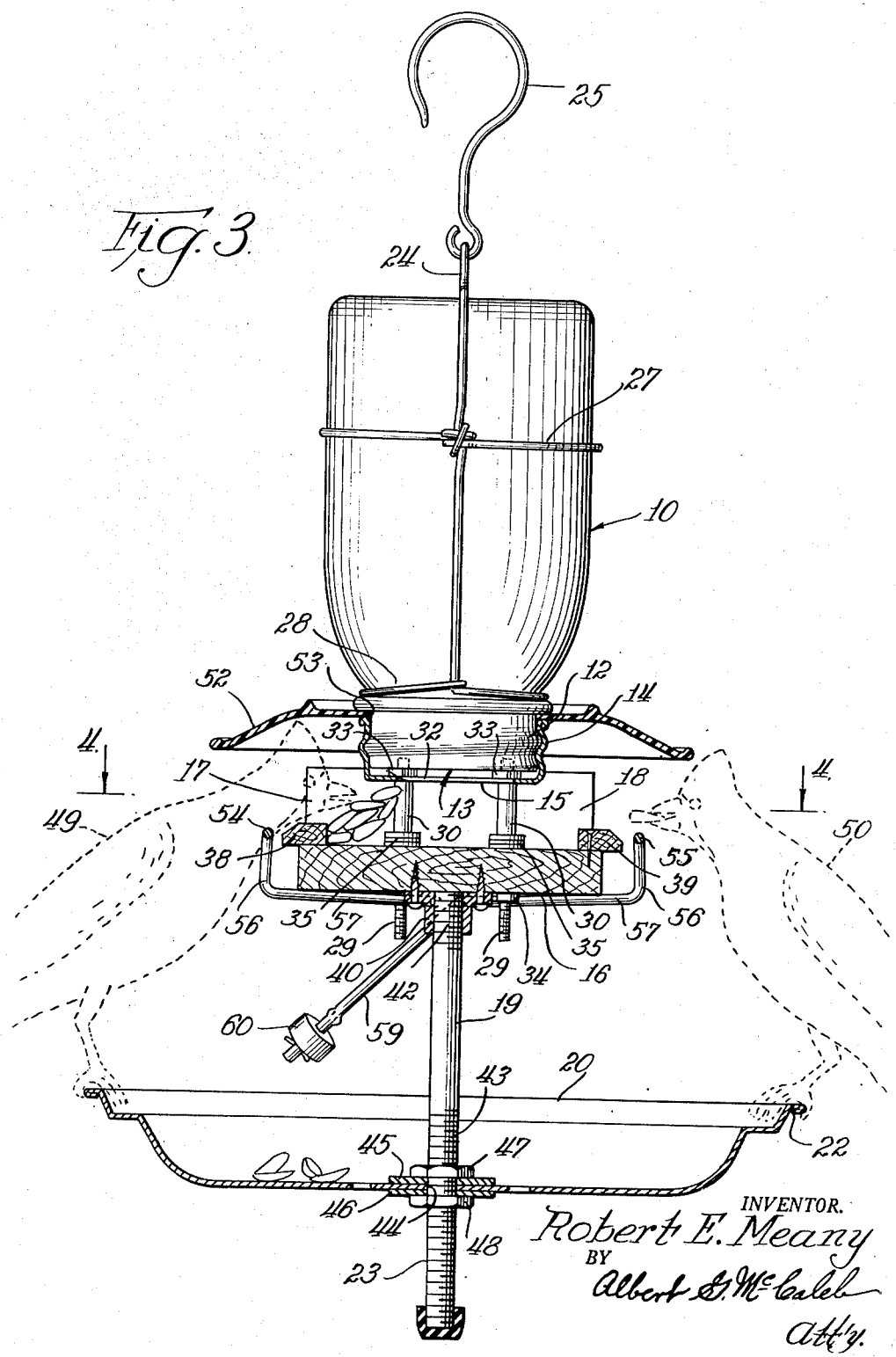

Fig. 3 is a side view of the feeder, partially in section and drawn to a larger scale than Figs. 1 and 2, and wherein the section is taken substantially as indicated by a line 3—3 in Fig. 2 and the accompanying arrows, and Fig. 4 is a top sectional view of my bird feeder wherein the section is taken substantially as indicated by a line 4—4 in Fig. 3 and in the direction signified by arrows.

Considered generally, the exemplary embodiment of my bird feeder which is shown in the accompanying drawings for illustrative purposes includes a feed container 10, which, in the present instance, is a glass fruit jar of the conventional type, and which has a threaded neck portion 12 at an open end 13 thereof. When the feeder is assembled for use, the neck portion 12 is threaded into a cap 14, which cap has an opening 15 therein through which feed from the container gravitates into a dish-like feeding trough 16. Although various numbers of feeding positions may be provided, the disclosed structure has side feeding openings 17 and 18 at diametrically opposed positions. Suspended below the feeding trough 16 on a central post 19 is a pan 20 which not only underlies the feeding trough so as to catch hulls, particles of feed and the like which are dropped by the bird, but also has a peripheral rim 22 thereon which is located below and outside of the periphery of the feeding trough to serve as a perch for one or more birds, upon which the bird or birds can stand naturally while facing the feeding openings. While the feeder may be supported by means such as a suitable fitting engaging a projecting end 23 of the central post 19, the disclosed feeder also includes a bail-type hanger 24 which is secured to the feed container 10 and has a hook 25 at the upper end by which the feeder may be hung from a convenient support.

Considered in greater detail, the detachable mounting of the feed container 10 provides for its ready removal for filling with feed, such as sun flower seed; the preferred transparency of the feed container permitting ready observance of the level of the supply of seed within the container, as indicated at 26, in Figs. 1 and 2. The bail-type hanger 24 extends downwardly along diametrically opposed sides of the feed container and is secured in place by a peripheral band 27 near the mid-portion of the container and a peripheral band 28 adjacent the neck portion of the container, neither of which bands interferes with the removal of the container from the base portion of the feeder or its installation upon the base portion of the feeder after filling.

The cap 14, into which the neck portion of the container fits, is secured to the mid-portion of the interior of the feeding trough by a plurality of screws 29 which are in spaced relationship peripherally of the cap and which have spacing collars 30 thereon for effecting a predetermined separation between a rim 32 of the cap and the interior surface of the feeding trough; the opposite ends of the screws being provided with nuts 33 and 34 for securing the screws in place relative to the cap and feeding trough respectively. In order to provide for some adjustment of the distance between the opening in the cap 14 and the interior of the feeding trough, I prefer to utilize washers 35 in addition to the spacing collars 30. By means of the variation of the number of such washers, the separation of the cap 14 from the interior of the feeding trough may be selectively determined for a particular feed, and so as to prevent the gravitational flow of feed through the feeding openings. Side walls 36 and 37 on the feeding trough 16 which, in the present instance, are generally arcuate in shape, extend upwardly to a level above the cap opening 15 on opposite sides of the feeding openings 17 and 18, thereby restricting the readily accessible feeding positions for birds to the feeding openings. Furthermore, in the disclosed structure, I have provided sills 38 and 39 which extend across the lower edges of the feeding openings as a further measure for preventing the gravitational flow of feed from the container through the feeding openings, while maintaining an accessible supply of feed immediately inside the feeding openings.

A flanged fitting 40 is secured to the lower surface of the feeding trough and receives a threaded end portion 42 of the central post 19. For purposes of adjustment, a portion 43 of the lower end of the post 19 is threaded, and the pan 20 has an opening 44 therein through which the threaded portion of the post extends; the pan being freely movable along the threaded portion of the post. While reinforcing washers 45 and 46 are preferred adjacent the opposite faces of the pan, nuts 47 and 48 which fit the threaded portion of the post provide an adjustment for moving the pan axially of the post and serve to hold the pan in an adjusted position.

It being desired by many bird lovers to select the kinds of birds to which the preferred feed is accessible, the relative positions, structures and arrangements, as well as the adjustability of the relative positions of the parts of my feeder are of considerable importance. In the illustration, Fig. 3, and as an example, I have depicted the use of the feeder by cardinals, which are shown in dot and dash lines at 49 and 50, one being at each of the two available feeding positions. From this illustration, it may be readily appreciated that the lateral dimension of the pan 20 is selected so that when the rim of the pan is used as a perch by a bird, it may naturally and normally face one of the feeding openings and have the feed within the opening within reach. Additionally, it is my preference that the lateral dimension of the pan and its spacing from the feeding openings shall be such that a bird is required to stretch to a somewhat abnormal position, as depicted by the bird 49, in acquiring feed from the trough. Thus, when a seed or the like has been acquired by the bird, it will move back to a normal standing position, as depicted by the bird 50, to eat the seed. From the latter position, any hulls or waste particles of the feed will fall outside the trough and be caught by the pan 20. In this manner, the trough is kept free of refuse, while such refuse or waste material is collected in an out of the way position by the pan. The disclosed structure and arrangement has a further and very definite advantage from the standpoint of sanitation, in that the excretia of the birds falls past the pan and is not collected by any part of the feeder.

From the foregoing discussion of the use of the feeder, it may be readily appreciated that the adjustment of the pan axially of the post 19 determines the minimum stature of a bird which can stand on the perch and acquire feed from the feeding openings. As a limitation upon the maximum size of the bird which can readily acquire feed from the feeding openings, as well as for protection of the feed in the trough from weather, I have provided a hood 52. This hood, in the disclosed structure, has somewhat the shape of an inverted dish and has an opening 53 therein which fits over the neck portion 12 of the feed container, so that it is held in place between the feed container and the cap 14, thereby providing a flange-type cover which projects outwardly beyond the periphery of the feeding trough. With this structure and arrangement, as well as by limitation of the width of the feeding opening, a bird is required to gain entrance to a feeding opening by the passage of its head beneath the hood. With both the maximum and minimum stature limits of the birds defined by the hood and the spacing of the perch from the feeding opening, a close selection may be made for feeding a desired kind of bird.

Although not considered to be a definite essential to the feeder structure, I have provided an additional element at each feeding opening which serves to prevent very small birds from gaining access to the feed by grasping onto any part of the feeding trough. For this purpose, I have provided guard rails or false perches 54 and 55 which extend across the lower edge of the outside of the feeding openings 17 and 18 respectively and are hingedly supported for downward swinging movement from those normal positions. In the present instance, I have made each such guard rail of a formed wire. Each includes vertical leg portions 56 at opposite ends of the guard rail itself, parallel leg portions 57 which normally assume a horizontal position and angularly disposed and coaxial portions 58; one of the parallel leg portions 57 having an extension 59 beyond the angularly disposed portion 58 and normally extending downwardly to carry a counterweight 60. The coaxial portions 58 of each guard rail structure are hingedly secured to the lower surface of the feeding trough by means such as staples 62. Thus, the guard rails are normally biased by the counterweights to positions in which they extend across the lower edge of the exterior of each feeding opening. If a small bird attempts to grasp the guard rail, it will swing downwardly and frighten the bird away from the opening.

From the foregoing description and reference to the accompanying drawings, it may be readily appreciated that in addition to providing a bird feeder which can be readily fabricated and easily supported for use, I have also illustrated structural features and an arrangement of a feeder which is neat, clean, sanitary and adapted to the selection of the kind of birds which are fed thereby.

While I have illustrated a preferred embodiment of my invention, many modications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A bird feeder comprising, in combination, a feed container having an open end and a threaded neck portion at the open end, a base structure including a dish-type feed retaining trough having a feeding opening in a side portion thereof, an apertured cap secured in spaced relationship to the mid-portion of the interior of the trough and threaded to receive the neck portion of the feed container so that feed gravitates through the open end of the container and apertured cap into the interior of the trough, and a pan secured below and in spaced relationship to the trough, said pan having a rim laterally outward of the trough which serves as a perch upon which a bird may sit while facing the feeding opening, and the shape and size of the pan and the spacing thereof from the feeding opening being such that said rim provides the only perch from which a bird may gain access to said feeding opening and such access is attained only when the rear portion of the bird projects beyond the pan.

2. A bird feeder as defined in claim 1, and further characterized by a hood in the form of a flange projecting outwardly laterally of the feeder above the feeding opening and wherein said hood is removably held in place between the neck portion of the feed container and the cap.

3. A bird feeder as defined in claim 1, and wherein said pan is secured to the trough by a central post, and means for adjusting the position of the pan along the post.

4. A bird feeder as defined in claim 1, and further characterized by adjustable means connecting the cap to the trough for varying the distance of the cap from the interior of the trough.

5. A bird feeder as defined in claim 1, and further characterized by a sill extending across the lower edge of said feeding opening for normally retaining feed within the trough.

6. A bird feeder as defined in claim 1, and further characterized by a movable guard rail normally extending across the exterior of the trough near the feeding opening, means hingedly supporting the guard rail for downward swinging movement from its normal position, and counterweights for normally maintaining the guard rail in its normal position.

7. A bird feeder as defined in claim 1, and wherein said feed retaining trough is of generally circular shape and has a plurality of said feeding openings in the side portion thereof, and said pan and the rim thereof being circular and substantially coaxial to the trough.

ROBERT E. MEANY.

REFERENCES CITED

The following references are of record in the file of this patent:

UNITED STATES PATENTS

| Number | Name | Date |
|---|---|---|
| 1,666,322 | West | Apr. 17, 1928 |
| 1,699,501 | McCartney | Jan. 15, 1929 |
| 1,812,530 | Healy | June 30, 1931 |
| 1,874,141 | Sueper | Aug. 30, 1932 |
| 2,230,058 | Hornung | Jan. 28, 1941 |
| 2,278,047 | Van Fleet | Mar. 31, 1942 |
| 2,298,398 | Marshaus | Oct. 13, 1942 |

FOREIGN PATENTS

| Number | Country | Date |
|---|---|---|
| 174,003 | Great Britain | Jan. 19, 1922 |
| 113,992 | Australia | Oct. 7, 1941 |